(12) United States Patent
Holmes et al.

(10) Patent No.: US 8,241,173 B2
(45) Date of Patent: Aug. 14, 2012

(54) SINGLE MOTOR HYBRID TRANSMISSION

(75) Inventors: Alan G. Holmes, Clarkston, MI (US); Brendan M. Conlon, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 402 days.

(21) Appl. No.: 12/685,700

(22) Filed: Jan. 12, 2010

(65) Prior Publication Data
US 2011/0167956 A1 Jul. 14, 2011

(51) Int. Cl.
*B60W 10/08* (2006.01)
*F16H 3/72* (2006.01)
(52) U.S. Cl. .................. 477/3; 475/5; 903/909
(58) Field of Classification Search ............. 477/3, 5, 477/108; 903/909
See application file for complete search history.

(56) References Cited

U.S. PATENT DOCUMENTS

| | | | | |
|---|---|---|---|---|
| 6,811,508 B2* | 11/2004 | Tumback | ............................ | 475/5 |
| 6,896,635 B2* | 5/2005 | Tumback | ............................ | 475/5 |
| 2002/0061803 A1* | 5/2002 | Aoki | ............................... | 477/3 |
| 2006/0042587 A1* | 3/2006 | Ellinger et al. | ................ | 123/305 |
| 2008/0200296 A1* | 8/2008 | Holmes | ............................ | 475/5 |

* cited by examiner

*Primary Examiner* — Edwin A Young
(74) *Attorney, Agent, or Firm* — Quinn Law Group, PLLC

(57) ABSTRACT

A hybrid transmission that is operatively connected with an engine includes an input member operatively connected with the engine, at least one intermediate member, and an output member. A plurality of selectively engagable torque-transmitting mechanisms enable the input member to be selectively operatively connected to the at least one intermediate member through the first gearing arrangement by engagement of different ones of a first set of the torque-transmitting mechanisms. A single motor/generator is operatively connectable to the at least one intermediate member and is selectively operatively connected to the output member in two alternative ways through the second gearing arrangement by selective engagement of two respective ones of a second set of the torque-transmitting mechanisms to establish two different torque ratios between the at least one intermediate member and the output member. The second set of torque-transmitting mechanisms includes dual output clutches that establish the two different torque ratios.

20 Claims, 3 Drawing Sheets

| Engaged | A | Step | B | Step | C |
|---|---|---|---|---|---|
| Lo | 1st 11.444 | 1.476 | 2nd 7.753 | 1.360 | 3rd 5.700 |
| | | | 1.392 | | |
| Hi | 4th 4.096 | 1.476 | 5th 2.775 | 1.360 | 6th 2.040 |

| Engaged | Step | A | Step | B | Step | C |
|---|---|---|---|---|---|---|
| C1 | | 1st 13.780 | | 3rd 5.156 | | 4th 3.815 |
| Step | | ⇨ 1.853 | ⇨ 1.442 | | 1.352 ⇨ | |
| C2 | | 2nd 7.437 | | 5th 2.783 | ⇦ 1.371 | 6th 2.059 |
| | | | | | 1.352 ⇨ | |

SINGLE MOTOR HYBRID TRANSMISSION

TECHNICAL FIELD

The invention relates to a single motor hybrid transmission for a vehicle.

BACKGROUND OF THE INVENTION

Multi-speed transmissions in automotive vehicles allow for operating efficiency and flexibilty. Gearing arrangements, such as planes of gears or planetary gear sets have been utilized to provide eight or more forward speed ratios. A number of selectively engagable torque-transmitting mechanisms are controlled to interconnect different members of the gearing arrangements with one another, with the transmission casing, or sometimes with the transmission input or output member to achieve the various speed ratios. Efficient packaging of the torque-transmitting mechanisms helps to minimize the overall dimensions of the transmission, potentially allowing its use in more vehicle platforms, reducing weight, and minimizing manufacturing complexity.

Hybrid powertrains for vehicles utilize different power sources under different vehicle operating conditions. An electro-mechanical hybrid powertrain typically has an internal combustion engine, such as a diesel or gasoline engine, and one or more motor/generators. Different operating modes, such as an engine-only operating mode, an electric-only operating mode, and a hybrid operating mode are established by engaging brakes and/or clutches in different combinations and controlling the engine and motor/generators. The various operating modes are advantageous, as they may be used to improve fuel economy. However, the additional components required for a hybrid powertrain, such as the motor/generators, brakes and/or clutches, may increase overall vehicle cost and packaging space requirements.

SUMMARY OF THE INVENTION

A relatively low cost hybrid transmission is provided that can achieve the fuel economy benefits and torque-smoothing advantages of a more complex hybrid transmission with only a single motor/generator and low mechanical content. Furthermore, the transmission may be configured as a "strong hybrid" in that it may be operated to provide idle stop (i.e., where the engine is stopped instead of idling and the motor/generator is used to restart the engine), regenerative braking, motor assist (i.e., use of the motor/generator, to add torque while the engine is propelling the vehicle), and electric-only, engine-off mode.

Specifically, a hybrid transmission that is operatively connected with an engine includes an input member operatively connected with the engine, at least one intermediate member, and an output member. A plurality of selectively engagable torque-transmitting mechanisms enable the input member to be selectively operatively connected to the at least one intermediate member through the first gearing arrangement by engagement of different ones of a first set of the torque-transmitting mechanisms to establish different torque ratios between the input member and the at least one intermediate member. A single motor/generator is operatively connectable to the at least one intermediate member and is selectively operatively connected to the output member in two alternative ways through the second gearing arrangement by selective engagement of two respective ones of a second set of the torque-transmitting mechanisms to establish two different torque ratios between the at least one intermediate member and the output member. The second set of torque-transmitting mechanisms includes dual output clutches that are engaged to establish the two different torque ratios. Thus, the transmission is configured with two stages: a first stage of torque transmission from the input member to the at least one intermediate member, and a second stage of torque transmission from the at least one intermediate member to the output member. The motor/generator can be controlled to provide or receive torque from the output member through the second gearing arrangement and the dual output clutches independently of torque transmission through the first gearing arrangement.

Different embodiments of the transmission include a first gearing arrangement arranged similarly to a manual transmission with multiple gear ratios between the input member and the at least one intermediate member, with the dual output clutches being dog clutches with synchronizers or plate clutches and the second gearing arrangement being intermeshing gears defining multiple gear planes or planetary gears. Alternatively, the first gearing arrangement may be arranged in a countershaft configuration.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1A, 1B:
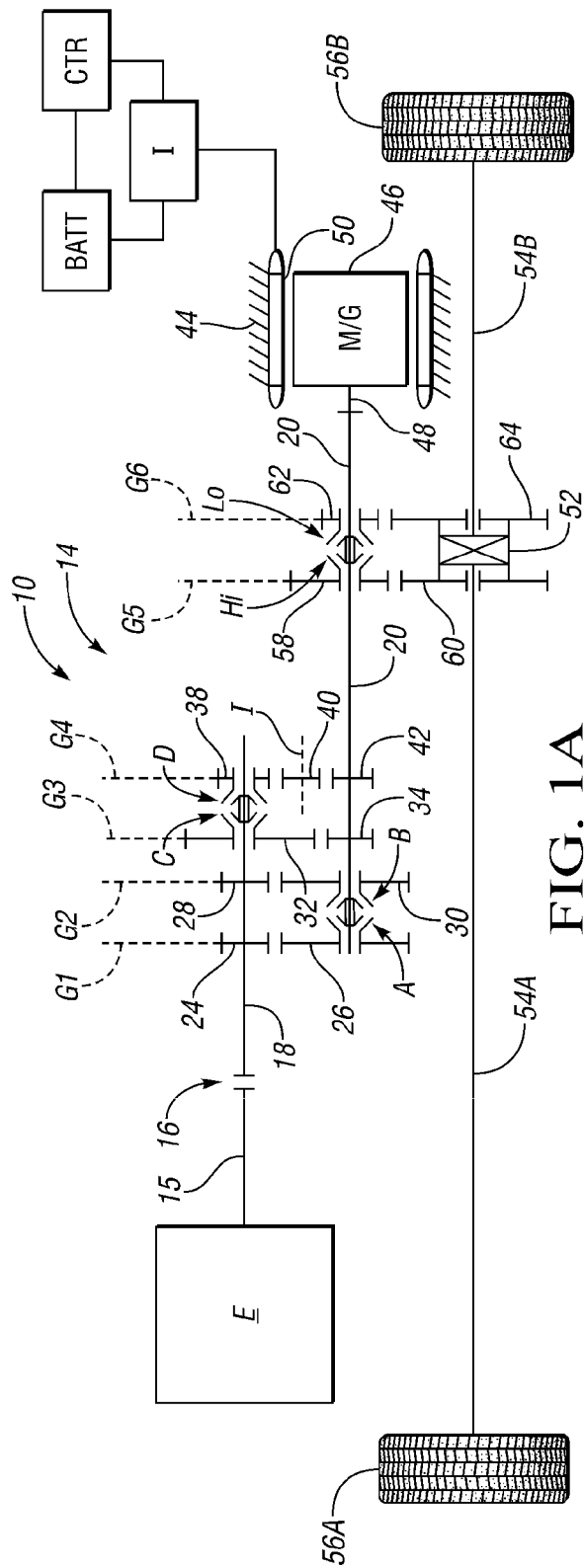
FIG. 1A is a schematic illustration of a first embodiment of a hybrid powertrain including a hybrid transmission.
FIG. 1B is a chart of exemplary gear ratios, ratio steps, and overall ratio for the transmission of FIG. 1A.

Referring to the drawings, wherein like reference numbers refer to like components throughout the several views, FIG. 1 shows a hybrid powertrain 10. The hybrid powertrain 10 has an engine E with a crankshaft 15 that is connectable to a hybrid electromechanical transmission 14 via engagement of a clutch 16. The clutch 16 may be a friction plate clutch, or, alternatively, a torque converter with lock-up clutch may be used. When the clutch 16 is engaged, the crankshaft 15 is connected for rotation with an input member 18 of the transmission 14. In this embodiment, the input member 18 is a shaft.

The transmission 14 is configured so that the input member 18 is operatively connected with an intermediate member 20 through a first gearing arrangement via selective engagement of a torque-transmitting mechanism in a first set of torque-transmitting mechanisms. The first set of torque-transmitting mechanisms includes four dog clutches with single synchronizers A, B, C and D. The first gearing arrangement includes intermeshing gears arranged to define four gear planes G1, G2, G3, G4. Gear 24 and gear 26 define gear plane G1. Gear 24 is connected for common rotation (i.e., rotation at the same speed) as input member 18. Gear 26 meshes with gear 24 and is concentric with and rotates freely about intermediate member 20 when dog clutch with synchronizer A is not engaged. Gear 26 is connected to rotate with intermediate member 20 when dog clutch with synchronizer A is shifted to the left by a shift fork to engage gear 26 with intermediate member 20, thereby allowing torque to be transferred from the input member 18 to the intermediate member 20 at a first torque ratio that is determined by the ratio of the number of teeth of gear 26 to the number of teeth of gear 24. Those skilled in the art will readily understand various configurations of dog clutches with synchronizers that are operable to connect a gear for rotation with a concentric shaft. Torque ratio and gear ratio are used interchangeably herein, ignoring torque losses, which are, in fact, relatively small under most operating conditions.

Gear 28 and gear 30 define gear plane G2. Gear 28 is connected for common rotation with input member 18. Gear 30 meshes with gear 28 and is concentric with and rotates freely about intermediate member 20 when dog clutch with synchronizer B is not engaged. Gear 30 is connected to rotate with intermediate member 20 when dog clutch with synchronizer B is shifted to the right by a shift fork to engage gear 30 with intermediate member 20, thereby allowing torque to be transferred from the input member 18 to the intermediate member 20 at a second torque ratio that is determined by the ratio of the number of teeth of gear 28 to the number of teeth of gear 30. The same shift fork may be used to engage dog clutches with synchronizers A and B.

Gear 32 and gear 34 define gear plane G3. Gear 34 is connected for common rotation with intermediate member 20. Gear 32 meshes with gear 34 and is concentric with and rotates freely about input member 18 when dog clutch with synchronizer C is not engaged. Gear 32 is connected to rotate with input member 18 when dog clutch with synchronizer C is shifted to the left by a shift fork to engage gear 32 with input member 18, thereby allowing torque to be transferred from the input member 18 to the intermediate member 20 at a third torque ratio that is determined by the ratio of the number of teeth of gear 32 to the number of teeth of gear 34.

Gear 38, gear 40 and gear 42 define gear plane G4. Gear 38 is concentric with and rotates freely about input member 18 when dog clutch with synchronizer D is not engaged. Gear 38 is connected to rotate with input member 18 when dog clutch with synchronizer D is shifted to the right by a shift fork to engage gear 38 with input member 18. Gear 40 is an idler gear that is supported by a stationary member, such as the transmission casing 44 to rotate about an axis I and mesh with gears 38 and 42. Gear 42 is connected for common rotation with intermediate member 20. When dog clutch with synchronizer D is engaged, torque may be transferred from the input member 18 to the intermediate member 20 at a reverse torque ratio that is determined by the ratio of the number of teeth of gear 38 to the number of teeth of gear 42. The same shift fork may be used to engage dog clutches with synchronizers C and D. If the battery B and motor/generator M/G are able to provide sufficient torque for reversing the vehicle, or if the engine E is reversible, the synchronizer D and gear plane G4 with gears 38, 40, 42 may be eliminated.

A single electric motor/generator M/G is connected with the intermediate member 20. Specifically, a rotor 46 is connected with a motor shaft 48 which in turn is connected for common rotation with the intermediate member 20. A stator 50 is grounded to the transmission casing 44. When electrical power is provided through an inverter I to the stator 50 from a battery BATT under the control of a controller CTR, torque may be provided by the motor/generator M/G to the intermediate member 20. Alternatively, the motor/generator M/G may be controlled to function as a generator that converts torque at the intermediate member 20 into electrical energy stored in the battery BATT.

The transmission 14 is configured so that the intermediate member 20 is operatively connected with an output member 52 of the transmission 14 through a second gearing arrangement via selective engagement of a torque-transmitting mechanism in a second set of torque-transmitting mechanisms. The output member 52 is a member of a differential that distributes torque to drive axles 54A, 54B to vehicle wheels 56A, 56B. For example, the output member 52 may be the carrier member of a differential, with torque distributed from the carrier member to the drive axles 54A, 54B by two side gears that mesh with a pinion gear supported by the differential carrier, as is known.

The second set of torque-transmitting mechanisms includes two single dog clutches with synchronizers Hi and Lo. The second gearing arrangement includes intermeshing gears arranged to define two gear planes G5, G6. Gear 58 and gear 60 define gear plane G5. Gear 60 is connected for common rotation with output member 52. Gear 58 meshes with gear 60 and is concentric with and rotates freely about intermediate member 20 when dog clutch with synchronizer Hi is not engaged. Gear 58 is connected to rotate with intermediate member 20 when dog clutch with synchronizer Hi is shifted to the left by a shift fork to engage gear 58 with intermediate member 20, thereby allowing torque to be transferred from the intermediate member 20 to the output member 52 at a torque ratio that is determined by the ratio of the number of teeth of gear 58 to the number of teeth of gear 60.

Gear 62 and gear 64 define gear plane G6. Gear 64 is connected for common rotation with output member 52. Gear 62 meshes with gear 64 and is concentric with and rotates freely about intermediate member 20 when dog clutch with synchronizer Lo is not engaged. Gear 62 is connected to rotate with intermediate member 20 when dog clutch with synchronizer Lo is shifted to the right by a shift fork to engage gear 62 with intermediate member 20, thereby allowing torque to be transferred from the intermediate member 20 to the output member 52 at another torque ratio that is determined by the ratio of the number of teeth of gear 62 to the number of teeth of gear 64.

The first gearing arrangement provides three forward torque ratios and a reverse ratio between the input member 18 and the intermediate member 20, while the second gearing arrangement provides two forward torque ratios between the intermediate member 18 and the output member 52.

Preferably, the gears are selected with tooth counts to provide relatively even steps between subsequent torque ratios established by the first set of torque-transmitting mechanisms between the input member and the intermediate member, and a larger step between two gear ratios established by the second set of torque-transmitting mechanisms between the intermediate member 20 and the output member 52. In one exemplary embodiment, the following gear tooth counts may be used: gear 24 with 24 teeth, gear 26 with 56 teeth, gear 28 with 31 teeth, gear 30 with 49 teeth, gear 32 with 37 teeth, gear 34 with 43 teeth, gear 38 with 20 teeth, gear 40 with 40 teeth, gear 42 with 20 teeth, gear 62 with 21 teeth, gear 64 with 103 teeth, gear 58 with 45 teeth and gear 60 with 79 teeth. With these tooth counts, the following three forward torque ratios may be established between the input member 18 and the intermediate member 20: torque ratio of 2.333 when dog clutch with synchronizer A is engaged, torque ratio 1.581 when dog clutch with synchronizer B is engaged, and torque ratio 1.162 when dog clutch with synchronizer C is engaged.

With these tooth counts, the following two torque ratios may be established between the intermediate member 20 and the output member 52: torque ratio of 4.905 when dog clutch synchronizer Lo is engaged, and torque ratio 1.756 when dog clutch with synchronizer Hi is engaged.

Thus, the transmission 14 is designed with two stages: a three-speed input stage (three speeds or torque ratios between the input member 18 and the intermediate member 20) and a two-speed output stage (two speeds or torque ratios between the intermediate member 20 and the output member 52). The torque-transmitting mechanisms may be controlled to provide six forward gear ratios with relatively even steps between the ratios. The motor/generator M/G may be used to provide continuous torque during transitions between the forward gear ratios, except for transitions from the dog clutch with synchronizer Lo to the dog clutch with synchronizer Hi, which occurs in shifting from the third to the fourth forward gear ratio.

Referring to FIG. 1B, the chart shows the gear ratios established in various speed ratios with the gear tooth counts set forth above. To establish a first fixed forward gear ratio, clutch 16, dog clutch/synchronizer A and dog clutch with synchronizer Lo are engaged. To establish a second fixed forward gear ratio, clutch 16, dog clutch/synchronizer B and dog clutch with synchronizer Lo are engaged. Thus, to shift from the first fixed forward gear ratio to the second fixed forward gear ratio, the friction clutch 16 is temporarily disengaged while a shift fork shifts to the right to disengage dog clutch with synchronizer A and engage dog clutch with synchronizer B, at which time the friction clutch 16 is engaged. To establish a third forward fixed gear ratio, dog clutch with synchronizer C and dog clutch with synchronizer Lo are engaged. Thus, to shift from the second forward fixed speed ratio to the third forward fixed speed ratio, the friction clutch 16 is temporarily disengaged while a shift fork moves to the left so that dog clutch with synchronizer B is disengaged while another shift fork moves to the right so that dog clutch with synchronizer C is engaged.

The first three forward fixed gears are carried out with dog clutch with synchronizer Lo remaining engaged. Three additional fixed forward speed ratios are established by repeating the same three gear ratios through the first gearing arrangement with dog clutch with synchronizer Hi engaged. In FIG. 1B, the gear ratios for each of the six forward gear ratios are set forth, as well as steps between adjacent gear ratios. Columns A, B, and C and row Lo and Hi indicate that the respective clutches indicated are engaged. With these gear ratios, the ratio coverage for the first gearing arrangement (ratio of gear ratio A to gear ratio C) is 2.008, the ratio coverage of the second gearing arrangement (ratio of gear ratio Lo to gear ratio Hi) is 2.794, and the overall ratio coverage (ratio of gear ratio A-Lo to gear ratio C-Hi) is 5.609. The first three gear ratios are used primarily for vehicle acceleration while the second three gear ratios are used merely for cruising. The highest gear, the sixth fixed gear ratio, need have only relatively little engine gradeability as torque from the motor/generator M/G can be used briefly to add torque during a transition to a lower gear ratio to climb a short grade or for passing.

In the first, second, and third fixed gear ratios, dog clutch with synchronizer Lo remains engaged. This allows the motor/generator M/G to provide torque at the output member 52 through the second gearing arrangement even during shifting between the first, second and third gear ratios i.e., when torque is not carried from input member 18 to intermediate member 20. Similarly, in the fourth, fifth, and sixth gear ratios, dog clutch with synchronizer Hi remains engaged. This allows the motor/generator M/G to provide torque at the output member 52 to the second gearing arrangement even during shifting between the fourth, fifth, and sixth gear ratios when power from the engine E to the wheels is interrupted (i.e., when torque is not carried from input member 18 to intermediate member 20). The connection of the motor generator M/G to the intermediate member 20 and through the second stage gearing arrangement to the output member 52 independently of any connection between the input member 18 and intermediate member 20, provides torque smoothing during shift transitions and allows the powertrain 10 to function as a strong hybrid. Acceleration is smoother than if the motor/generator M/G were coupled to the engine E or to the input member 18. Furthermore, with two output gear ratios, the motor/generator M/G can operate at high speed for acceleration and at lower speed for efficient cruising. Furthermore, if torque does not flow through the second gearing arrangement (i.e., neither dog clutch with synchronizer Lo nor dog clutch with synchronizer Hi is engaged, then the engine E can be started by the motor/generator M/G with the vehicle at rest, or the engine E can operate the motor/generator M/G as a generator.

Optionally, the two torque ratios of the second gearing arrangement can be established by a planetary gear set having a selectively engagable brake to allow torque transmission at a reduction ratio, and a clutch to allow torque transmission at a direct drive ratio in lieu of the sets of intermeshing gears of gear planes G5 and G6 and the dog clutches with synchronizers Lo, Hi. An exemplary second gearing arrangement is shown and described with respect to FIG. 2C.

Figures 2A, 2B:
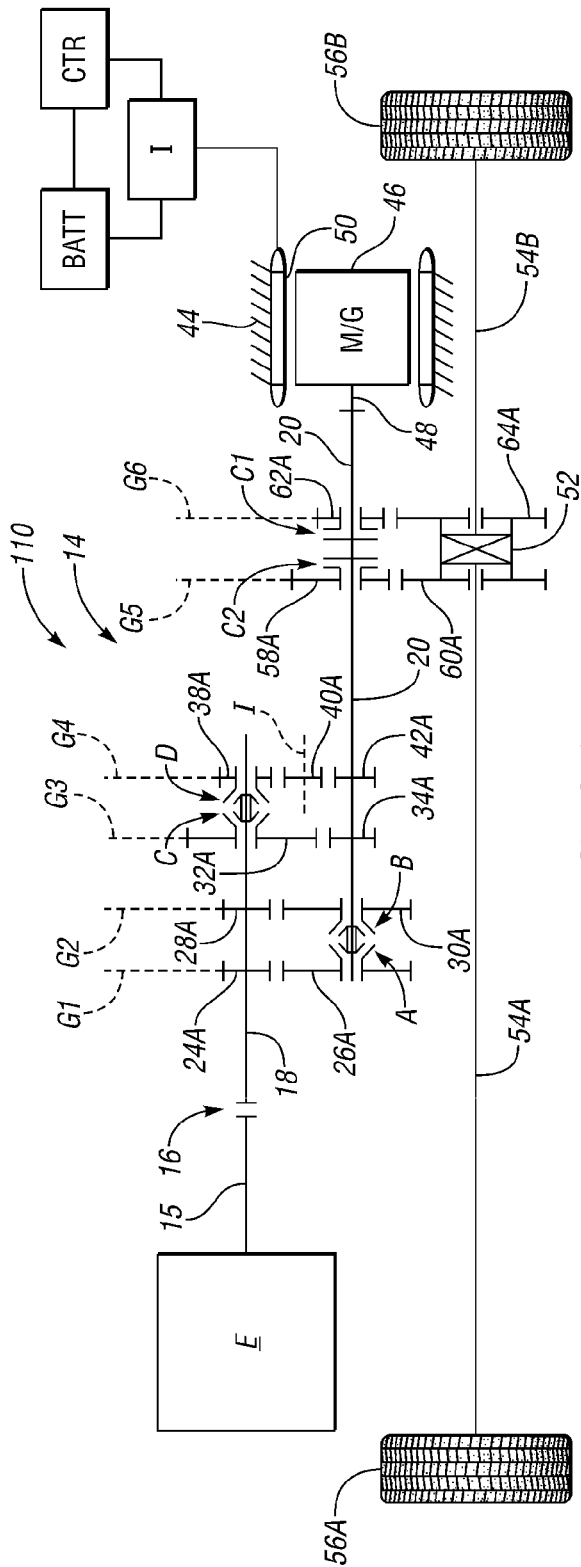
FIG. 2A is a schematic illustration of a second embodiment of a hybrid powertrain including a hybrid transmission.
FIG. 2B is a chart of exemplary gear ratios, ratio steps, and overall ratio for the transmission of FIG. 2A.

Referring to FIG. 2A, another embodiment of a powertrain 110 is shown. Powertrain 110 is alike in all aspects as powertrain 10, except that dog clutches with synchronizers Lo, and Hi are replaced with plate clutches C1 and C2, and the gear tooth counts and shift schedule are changed. Components identical to those in FIG. 1A are referred to with identical reference numbers. Gears 24A, 26A, 28A, 30A, 32A, 34A, 38A, 40A, 42A, 58A, 60A, 62A, and 64A are arranged and function the same as corresponding gears 24, 26, 28, 30, 32, 34, 38, 40, 42, 58, 60, 62 and 64 but have different tooth numbers.

In one exemplary embodiment, the following gear tooth counts may be used: gear 24A with 21 teeth, gear 26A with 59 teeth, gear 28A with 39 teeth, gear 30A with 41 teeth, gear 32A with 45 teeth, gear 34A with 35 teeth, gear 38 with 20 teeth, gear 40 with 40 teeth, gear 42 with 20 teeth, gear 62A with 21 teeth, gear 64A with 103 teeth, gear 58A with 34 teeth and gear 60A with 90 teeth. With these tooth counts, the following three forward torque ratios may be established between the input member 18 and the intermediate member 20: torque ratio of 2.810 when dog clutch with synchronizer A is engaged, torque ratio 1.051 when dog clutch with synchronizer B is engaged, and torque ratio 0.778 when dog clutch with synchronizer C is engaged. With these tooth counts, the following two torque ratios may be established between the intermediate member 20 and the output member 52; torque ratio of 4.905 when plate clutch C1 is engaged, and torque ratio 2.674 when plate clutch C2 is engaged. With these gear ratios, the ratio coverage for the first gearing arrangement (ratio of gear ratio A to gear ratio C) is 3.612, the ratio coverage of the second gearing arrangement (ratio of gear ratio Hi to gear ratio Lo) is 1.853, and the overall ratio coverage (ratio of gear ratio A-Lo to gear ratio C-Hi) is 6.693.

Referring to FIG. 2B, the chart shows the gear ratios established in various speed ratios with the gear tooth counts set forth above. To establish a first fixed forward gear ratio, clutch 16, dog clutch/synchronizer A and plate clutch C1 are engaged, resulting in a torque ratio of 13.780 between the output member 52 and the input member 18.

To establish a second fixed forward gear ratio, clutch 16, dog clutch/synchronizer A and plate clutch C2 are engaged, resulting in a torque ratio of 7.437 of the output member 52 to the input member 18. The arrows in FIG. 2B indicate subsequent shifts of increasing speed ratio (i.e., decreasing torque ratio) as vehicle speed increases. Thus, to shift from the first fixed forward gear ratio to the second fixed forward gear ratio, clutch C2 can be slipped as clutch C1 is disengaged.

To establish a third forward fixed gear ratio, clutch 16, dog clutch with synchronizer B and plate clutch C1 are engaged. Thus, to shift from the second forward fixed speed ratio to the third forward fixed speed ratio, the friction clutch 16 is temporarily disengaged while a shift fork moves to the right so that dog clutch with synchronizer A is disengaged and dog clutch with synchronizer B is engaged. Plate clutch C1 slips to engage while plate clutch C2 is disengaged. In the third forward fixed gear ratio, the torque ratio between the output member 52 and the input member 18 is 5.156.

To establish a fourth forward fixed gear ratio, clutch 16, dog clutch with synchronizer C and plate clutch C1 are engaged. Thus, to shift from the third forward fixed speed ratio to the fourth forward fixed speed ratio, the friction clutch 16 is temporarily disengaged while a shift fork moves to the right so that dog clutch with synchronizer B is disengaged and dog clutch with synchronizer C is engaged. Plate clutch C1 remains engaged. In the fourth forward fixed gear ratio, the torque ratio between the output member 52 and the input member 18 is 3.815.

To establish a fifth forward fixed gear ratio, clutch 16, dog clutch with synchronizer B and plate clutch C2 are engaged. Thus, to shift from the fourth forward fixed speed ratio to the fifth forward fixed speed ratio, the friction clutch 16 is temporarily disengaged while a shift forks move to disengage dog clutch with synchronizer C and engage dog clutch with synchronizer B. Plate clutch C2 slips to engage while plate clutch C1 is disengaged. In the fifth forward fixed gear ratio, the torque ratio between the output member 52 and the input member 18 is 2.783.

To establish a sixth forward fixed gear ratio, clutch 16, dog clutch with synchronizer C and plate clutch C2 are engaged. Thus, to shift from the fifth forward fixed speed ratio to the sixth forward fixed speed ratio, the friction clutch 16 is temporarily disengaged while shift forks move so that dog clutch with synchronizer B is disengaged and dog clutch with synchronizer C is engaged. Plate clutch C2 remains engaged. In the sixth forward fixed gear ratio, the torque ratio between the output member 52 and the input member 18 is 2.059.

By using plate clutches to establish torque flow through the second gearing arrangement, there need never be an interruption in torque flow from the intermediate member 20 to the output member 52, because one of the plate clutches can be slipped while the other is disengaged. Thus, with the possibility of carrying torque during all shifts between gear ratios, the motor/generator M/G can provide torque during all shift transitions. This allows step ratios between the gear ratios to be selected to allow the motor/generator M/G to provide torque at the output member 52 through the second gearing arrangement approximately a 2.0 step between the first and second torque ratios through the second gearing arrangement, which is an ideal step for allowing an efficient motor size for electric propulsion needs.

The shift from the first fixed forward gear ratio to the second fixed forward gear ratio can be made without completely interrupting the flow of torque from the engine E to the wheels 56A and 56B. Both the engine E and motor/generator M/G can be used for propulsion through this shift, which is generally the most important for acceleration from rest. Likewise, a shift from the top fixed forward gear ratio, i.e. sixth, to a fixed forward gear ratio two steps below it, i.e. fourth, can be made without completely interrupting the flow of torque from the engine E to the wheels 56A and 56B. Again, both the engine E and motor/generator M/G can be used for propulsion through this shift, which is often made for passing slower vehicles on the highway.

Figure 2C:
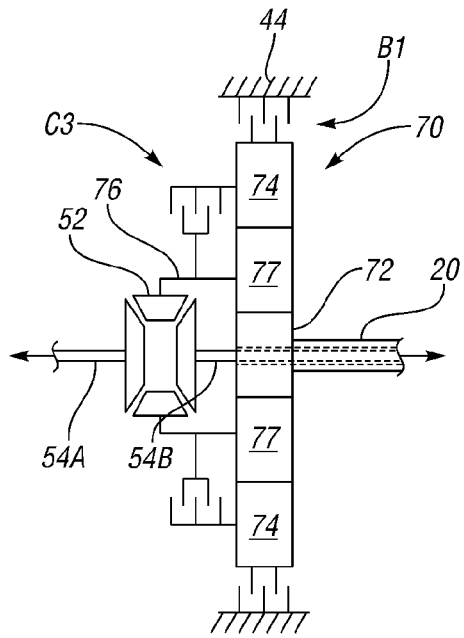
FIG. 2C is a schematic illustration in fragmentary view of an alternate second gearing arrangement for the transmission of FIG. 2A.

Referring to FIG. 2C, an alternative second gearing arrangement is provided. The second gearing arrangement uses a planetary output in lieu of the sets of intermeshing gears 58A, 60A and 62A, 64A. The second gearing arrangement provides torque from the intermediate member 20 to the output member 52 at two different gear ratios, and uses a planetary gear set 70 with a sun gear member 72 connected to intermediate member 20, a ring gear member 74, and a carrier member 76 rotatably supporting pinion gears 77 that mesh with both the sun gear member 72 and ring gear member 74. The carrier member 76 is connected for common rotation with the output member 52. The motor/generator M/G is connected to provide a reduction gear ratio from the intermediate member 20 through the planetary gear set to the output member 52 when a brake B1 is engaged, and at a direct drive ratio through the gear set 70 when clutch C3 is engaged to connect ring gear member 74 for rotation with carrier member 76. The intermediate member 20 is a sleeve shaft and sun gear member 72 has a center opening to allow drive member 54B to extend through to the other side of the transmission. Such a second gearing arrangement may be preferable for a front wheel-drive transmission (or a rear wheel-drive transmission if positioned to the right of motor/generator M/G in FIG. 2C, as described above) with planetary gear sets used in the first gearing arrangement.

Another alternative second gearing arrangement may have a compound planetary gear set with a sun gear member, a carrier member and a ring gear member. The carrier member supports two different sets of pinion gears. A first set of the pinion gears meshes with the sun gear member and with the second set of pinion gears. The second set of pinion gears meshes with the first set of pinion gears and with the ring gear member. In this alternative second gearing arrangement, the intermediate member 20 is connected for rotation with the sun gear member, the carrier member is selectively grounded to the stationary member via brake B1, and the ring gear member is selectively connected for rotation with the output member 52 via clutch C3. The tooth counts of the ring gear member and the sun gear member of this alternative second gearing arrangement could be configured so that the two ratios provided through the arrangement have a ratio of 2.0.

Figure 3:
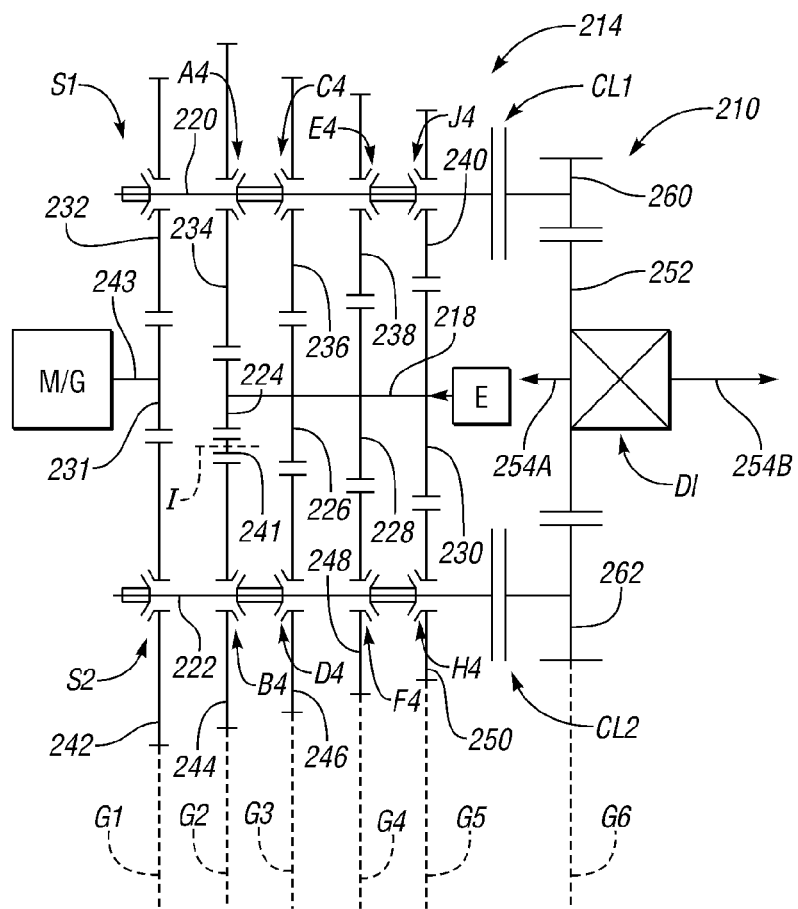
FIG. 3 is a schematic illustration of a third embodiment of a hybrid powertrain including a hybrid transmission.

Referring to FIG. 3, another embodiment of a powertrain 210 has an engine E operatively connectable through a first gearing arrangement to first and second intermediate members 220, 222 at multiple torque ratios and to an output member 252. The powertrain 210 also has a motor/generator M/G operatively connectable to the output member 252 at two different torque ratios through a second gearing arrangement of a countershaft-type transmission 214.

Specifically, the engine E is connected for common rotation with an input member 218. Gears 224, 226, 228 and 230 are connected for common rotation with input member 218. A first intermediate member 220 and a second intermediate member 222 are spaced from the input member 218, and may be referred to as countershafts. First intermediate member 220 supports gears 232, 234, 236, 238 and 240 for rotation concentrically about first intermediate member 220. Second intermediate member 222 supports gears 242, 244, 246, 248 and 250 for rotation about second intermediate member. Gear 224 meshes with gear 234 and with an idler gear 241 that rotates about an axis I and meshes with gear 244. Gears 226 meshes with gears 236 and 246. Gear 228 meshes with gears 238 and 248. Gear 230 meshes with gears 240 and 250.

The above-referenced gears are aligned as shown as sets of intermeshing gears to define four gear planes G2, G3, G4, and G5. The gears in these gear planes may be referred to as a first gearing arrangement. The idler gear 241 and gear 244 are used to establish a reverse speed ratio between the input member 218 and the output member 252. However, idler gear 241 and gear 244 are optional, because in other embodiments the motor/generator M/G discussed below may be controlled to provide a reverse speed ratio to the output member 252 if it is of sufficient power to propel the vehicle without assistance from the engine E.

Dog clutches with synchronizers A4, C4, E4 and J4 are arranged on the first intermediate member 220. Dog clutch with synchronizer A4 is shiftable to the left to engage and connect gear 234 for common rotation with intermediate member 220. Dog clutch with synchronizer C4 is shiftable to the right to engage and connect gear 236 for common rotation with intermediate member 220. Dog clutch with synchronizer E4 is shiftable to the left to engage and connect gear 238 for common rotation with intermediate member 220. Dog clutch with synchronizer J4 is shiftable to the right to engage and connect gear 240 for common rotation with intermediate member 220. Dog clutches with synchronizers A4 and C4 may be combined as a dual synchronizer. Dog clutches with synchronizers E4 and J4 may be combined as a dual synchronizer. When a respective one of the dog clutches with synchronizers A4, E4, C4 and J4 is engaged, torque is transferred from the input member 218 to the intermediate member 220 at a respective torque ratio established by the gear ratio of the intermeshing gears 234 and 224, 236 and 226, 238 and 228, or 240 and 230.

Alternately, torque may be transferred from the input member 218 to the intermediate member 222 by engagement of any of dog clutches with synchronizers B4, D4, F4 and H4, which are supported for rotation with the intermediate member 222. Dog clutch with synchronizer B4 is shiftable to the left to engage and connect gear 244 for common rotation with intermediate member 222. Dog clutch with synchronizer D4 is shiftable to the right to engage and connect gear 246 for common rotation with intermediate member 222. Dog clutch with synchronizer F4 is shiftable to the left to engage and connect gear 248 for common rotation with intermediate member 222. Dog clutch with synchronizer H4 is shiftable to the right to engage and connect gear 250 for common rotation with intermediate member 222. Dog clutches with synchronizers B4 and D4 may be combined as a dual synchronizer. Dog clutches with synchronizers F4 and H4 may be combined as a dual synchronizer. When a respective one of the dog clutches with synchronizers B4, D4, F4 and H4 is engaged, torque is transferred from the input member 218 to the intermediate member 222 at a respective torque ratio established by the gear ratio of the intermeshing gears 244, 241 and 224; 246 and 226; 248 and 228; or 250 and 230. Dog clutches with synchronizers A4, C4, E4, J4, B4, D4, F4 and H4 are a first set of torque-transmitting mechanisms.

A motor/generator M/G is selectively alternately connectable to the intermediate members 220 and 222 through intermeshing gears 231, 232, or 231, 242 by selective engagement of dog clutch with synchronizer S1 or S2, respectively. Gears 231, 232 and 242 define a gear plane G1. Gear 231 is connected for rotation with a shaft 243 of the motor/generator MG. Gear 231 meshes with gears 232 and 242. Gear 232 is rotatable about intermediate member 220 and is selectively engaged for common rotation with intermediate shaft 220 by engagement of the dog clutch with synchronizer S1. Gear 242 is rotatable about intermediate member 222 and is selectively engaged for common rotation with intermediate shaft 222 by engagement of the dog clutch with synchronizer S2. In one possible strategy, the dog clutches with synchronizers S1, S2 are controlled so that torque from the motor/generator M/G is transferred to the intermediate member 220, 222 that is not carrying torque from the E (i.e., to the opposite intermediate member than the one that has an engaged dog clutch with synchronizer and is carrying torque from the input member 218).

Dual output plate clutches CL1 and CL2 are selectively alternately engagable to transfer torque from the intermediate members 220, 222 to an output member 252 (also referred to as gear 252) through gears 260, 262 which mesh with gear 252. Gear 252 meshes with gears 260 and 262 to define a gear plane G6. Output member 252 is connected for rotation with a member of a differential gear set DI that distributes torque to final drive input members 254A and 254B, as is known. The gears 260, 262 are a second gearing arrangement and clutches CL1 and CL2 are a second set of torque-transmitting mechanisms.

The motor/generator M/G and torque-transmitting mechanisms may be controlled to provide continuous torque at the output member 252 when the engine E is providing torque (i.e., while in gear and during shifts between fixed gear ratios on different intermediate shafts) and also when engine E is not providing torque at the output member 252 (i.e., during shifting between fixed gear ratios on the same intermediate shaft, or during electric driving or regenerative braking). For example, in a first forward speed ratio, engine torque is transferred from the input member 218 to the output member 252 by engagement of dog clutch with synchronizer A4 and clutch CL1. At the same time, the motor/generator M/G may be adding torque at the output member 252 if dog clutch with synchronizers S2 and plate clutch CL2 are engaged. To shift to a second fixed forward gear ratio on the other intermediate shaft, dog clutch with synchronizer D4 and clutch CL2 must be engaged. If motor/generator M/G was already providing torque at the output member 252, then the second intermediate shaft 222 is already rotating near a speed sufficient to engage dog clutch with synchronizer D4. Second intermediate shaft 222 can be synchronized under control of M/G and synchronizer D4 to allow the synchronizer D4 to be engaged. Clutch CL2 can be slipped to transmit M/G torque to output member 252 during the synchronization phase. Once D4 is engaged, a clutch-to-clutch shift from CL1 to CL2 can be executed to complete the shift. Third, fourth, fifth, sixth and seventh forward gear ratios are also provided by engaging dog clutch with synchronizers C4, F4, E4, H4 and J4, respectively, along with the appropriate respective clutch CL1 or CL2. Many different motor and engine ratio combinations are possible. In this embodiment, two different torque ratios are established through the second gearing arrangement as gears 260 and 262 have different tooth counts, as is apparent from FIG. 3.

The motor/generator M/G and torque-transmitting mechanisms may also be controlled to provide continuous torque at the output member 252 while the engine E is shifting between two fixed gear ratio on the same intermediate shaft. For example, in a first forward speed ratio, engine torque is transferred from the input member 218 to the output member 252 by engagement of dog clutch with synchronizer A4 and clutch CL1. At the same time, the motor/generator M/G may be adding torque at the output member 252 if dog clutch with synchronizers S2 and plate clutch CL2 are engaged. To shift to a second fixed forward gear ratio on the same intermediate shaft 220, clutch C1 must be slipped, offgoing dog clutch with synchronizer A4 is disengaged, the engine synchronized to the new gear ratio, the oncoming dog clutch with synchronizer C4 engaged, and finally clutch C1 reapplied. During this shift, M/G may continue to adding torque at the output member 252 through intermediate shaft 222.

Motor/generator M/G may also be used to propel or brake the vehicle independently of the engine E while in EV mode or during regenerative braking. In EV mode, with the engine E off and synchronizers A4, C4, E4, J4, B4, D4, F4, H4 disengaged, the transmission 214 can preselect the shaft which is not transmitting power by engaging the appropriate synchronizer 51 or S2 and can then execute a clutch-to-clutch shift between CL1 and CL2 while M/G continues to provide positive torque to output member 252. During braking, the engine E can be placed in neutral (disengaging all synchronizers A4-H4) and can idle or stop. With the engine synchronizers disengaged, the transmission 214 can execute clutch-to-clutch braking shifts between CL1 and CL2 while braking electrically while M/G continues to provide negative torque to output member 252.

Motor/generator M/G may be used to start the engine E in a cold start or from a start/stop by engaging either of the dog clutch with synchronizers S1 or S2 and one of the dog clutch with synchronizers on the intermediate shaft 220 or 222 that the motor/generator M/G is then operatively connected to by the engaged S1 or S2. When starting the engine E in this manner, the output member 252 is not connected with the intermediate member 220 or 222 as neither clutch CL1 or CL2 is engaged. Additionally, if the motor/generator M/G has sufficient power to propel the vehicle, one of the clutches S1 or S2 can be engaged along with the corresponding one of CL1 or CL2 so that the motor/generator M/G can drive the output member 252, and the other clutch S1 or S2 can be slipped and one of the synchronizers on the intermediate member 220 or 222 that is concentric with that clutch engaged to start the engine E.

The motor/generator M/G may be controlled to operate as a generator by engaging one of S1 or S2 (depending on which of the intermediate members 220 and 222 is carrying torque) to thereby transfer some torque to the motor/generator MG, which converts the torque into stored electrical energy in a battery. Although not shown in FIG. 3, a battery, inverter and controller are connected to the motor/generator M/G as described with respect to the embodiments of FIGS. 1A, 2A and 2C.

While the best modes for carrying out the invention have been described in detail, those familiar with the art to which this invention relates will recognize various alternative designs and embodiments for practicing the invention within the scope of the appended claims.

The invention claimed is:

1. A hybrid transmission operatively connected with an engine, comprising:
    an input member operatively connected with the engine;
    at least one intermediate member;
    an output member;
    a plurality of selectively engagable torque-transmitting mechanisms;
    a first and a second gearing arrangement;
    wherein the input member is selectively operatively connected to the at least one intermediate member through the first gearing arrangement by engagement of different ones of a first set of the torque-transmitting mechanisms to establish different torque ratios between the input member and the at least one intermediate member; and
    a single motor/generator operatively connectable to the at least one intermediate member and selectively operatively connected to the output member in two alternative ways through the second gearing arrangement by selective engagement of two respective ones of a second set of the torque-transmitting mechanisms to establish two different torque ratios between the at least one intermediate member and the output member.

2. The hybrid transmission of claim 1, wherein the input member, the at least one intermediate member and the output member are shafts that are parallel with one another.

3. The hybrid transmission of claim 1, wherein the torque-transmitting mechanisms are engaged to establish at least some of the different torque ratios of the first gearing arrangement in decreasing numerical value while a higher of the two different torque ratios of the second gearing arrangement is established and to subsequently repeat at least some of the different torque ratios of the first gearing arrangement while a lower of the two different torque ratios of the second gearing arrangement is established.

4. The hybrid transmission of claim 1, wherein selected ones of the torque-transmitting mechanisms are engaged to connect the input member with the at least one intermediate member while the output member is not connected with the at least one intermediate member so that the motor/generator is operable to start the engine while disconnected from the output member.

5. The hybrid transmission of claim 4, wherein selected ones of the torque-transmitting mechanisms are engaged to connect the engine with the output member and the motor/generator with the output member; and wherein the motor/generator is operable as a generator while the engine provides torque to the output member.

6. The hybrid transmission of claim 4, wherein the at least one intermediate member includes a first intermediate member and a second intermediate member arranged as countershafts with respect to the input member; and wherein the torque-transmitting mechanisms include a first and a second clutch selectively engagable to connect the motor/generator for common rotation with the first and the second intermediate members, respectively.

7. The hybrid transmission of claim 1, wherein the first gearing arrangement includes intermeshing gears defining multiple gear planes, with each gear plane defined by a respective first gear rotatable with one of the input member and the intermediate member and a respective second gear rotatable about the other of the input member and the intermediate member; and
    wherein the torque-transmitting mechanisms include dog clutches with synchronizers, the dog clutches each operable to selectively engage a respective one of the second gears with the other of the input member and the intermediate member to transfer torque between the input member and the intermediate member.

8. A hybrid transmission comprising:
    an input member;
    an intermediate member;
    a first gearing arrangement operatively connected between the input member and the intermediate member and configured to provide different torque ratios between the input member and the intermediate member;
    an output member;
    a second gearing arrangement operatively connected between the intermediate member and the output member and configured to provide at least two different torque ratios between the intermediate member and the output member;

a plurality of selectively engagable torque-transmitting mechanisms engagable in different combinations to establish the torque ratios between the input member and the intermediate member and the torque ratios between the intermediate member and the output member;

an electric motor/generator operatively connected to the intermediate member and operable to provide driving torque to the intermediate member; and wherein the transmission is configured such that the motor/generator provides continuous driving torque to the intermediate member during at least one transition between two of the different torque ratios between the input member and the intermediate member when driving torque at the input member is not transmitted to the intermediate member.

9. The hybrid transmission of claim 8, wherein the torque-transmitting mechanisms are engaged to establish at least some of the different torque ratios of the first gearing arrangement in decreasing numerical value while a higher of the two different torque ratios of the second gearing arrangement is established and to subsequently repeat at least some of the different torque ratios of the first gearing arrangement while a lower of the two different torque ratios of the second gearing arrangement is established.

10. The hybrid transmission of claim 8, in combination with an engine connected to the input member; wherein selected ones of the torque-transmitting mechanisms are engaged to connect the input member with the intermediate member through the first gearing arrangement while the output member is not connected with the intermediate member through the second gearing arrangement so that the motor/generator is operable to start the engine while disconnected from the output member.

11. The hybrid transmission of claim 8, wherein the first gearing arrangement includes intermeshing gears defining multiple gear planes, each gear plane being defined by a respective first gear rotatable with one of the input member and the intermediate member and a respective second gear rotatable about the other of the input member and the intermediate member; and wherein the torque-transmitting mechanisms of the first gearing arrangement are dog clutches with synchronizers each operable to selectively engage a respective one of the second gears with the other of the input member and the intermediate member to transfer torque between the input member and the intermediate member.

12. The hybrid transmission of claim 11, wherein the second gearing arrangement includes other intermeshing gears defining two other gear planes, each of the two other gear planes planes being defined by one respective gear rotatable about one of the intermediate member and the output member and another respective gear rotatable with the other of the intermediate member and the output member; and wherein the torque-transmitting mechanisms of the second gearing arrangement are dog clutches with synchronizers each operable to selectively engage the respective gear rotatable about one of the intermediate member and the output member with the one of the intermediate member and the output member to transfer torque between the intermediate member and the output member.

13. The hybrid transmission of claim 12, wherein the motor/generator provides power to the output member via the second gearing arrangement during all shifts of torque-transmitting mechanisms of the first gearing arrangement to transition between torque ratios except during shifting between engagement of the torque-transmitting mechanisms of the second gearing arrangement.

14. The hybrid transmission of claim 11, wherein the second gearing arrangement includes other intermeshing gears defining two other gear planes, each of the two other gear planes planes being defined by one respective gear rotatable about one of the intermediate member and the output member and another respective gear rotatable with the other of the intermediate member and the output member; and wherein the torque-transmitting mechanisms of the second gearing arrangement are plate clutches, each plate clutch being operable to selectively engage the respective gear rotatable about one of the intermediate member and the output member with the one of the intermediate member and the output member to transfer torque between the intermediate member and the output member.

15. The hybrid transmission of claim 14, wherein the motor/generator provides power to the output member via the second gearing arrangement during all shifts of torque-transmitting mechanisms to transition between torque ratios including during shifting between engagement of the torque-transmitting mechanisms of the second gearing arrangement; wherein the torque-transmitting mechanisms of the second gearing arrangement are slipped to shift.

16. The hybrid transmission of claim 15, wherein the second gearing arrangement is operable to provide two different torque ratios between the intermediate member and the output member; and wherein a ratio of the two different torque ratios of the second gearing arrangement is approximately 2.0.

17. The hybrid transmission of claim 11, wherein the second gearing arrangement is a planetary gear set having a sun gear member, a carrier member, and a ring gear member; and wherein the torque-transmitting mechanisms of the second gearing arrangement include a first plate clutch selectively engagable to ground one of the members of the planetary gear set to a stationary member, and a second plate clutch selectively engagable to connect the other two members of the planetary gear set for common rotation.

18. A hybrid transmission comprising:
an input member;
at least one intermediate member;
a first gearing arrangement operatively connected between the input member and the at least one intermediate member and configured to provide different torque ratios between the input member and the at least one intermediate member;
an output member;
a second gearing arrangement operatively connected between the at least one intermediate member and the output member and configured to provide two different torque ratios between the at least one intermediate member and the output member;
a plurality of selectively engagable torque-transmitting mechanisms engagable in different combinations, some of which establish the torque ratios between the input member and the at least one intermediate member when engaged and others of which establish the torque ratios between the at least one intermediate member and the output member when engaged;
an electric motor/generator operatively connectable to the at least one intermediate member to provide driving torque to the at least one intermediate member, and thereby provide driving torque to the output member in either of two different torque ratios when one of the torque ratios between the at least one intermediate member and the output member is established; and wherein the transmission is configured such that the electric motor/generator provides continuous driving torque to the at least one intermediate member during at least one transition between two of the different torque ratios between the input member and the intermediate member.

19. The hybrid transmission of claim 18, wherein the at least one intermediate member includes a first and a second countershaft; wherein the motor/generator is selectively alternately coupled to the first countershaft and the second countershaft by respective ones of the torque-transmitting mechanisms as torque at the input member is provided to the other of the first and second countershafts via the first gearing arrangement.

20. The hybrid transmission of claim 19, in combination with an engine connected to the input member; wherein selected ones of the torque-transmitting mechanisms are engaged to connect the input member with the at least one intermediate member through the first gearing arrangement while the output member is not connected with the at least one intermediate member through the second gearing arrangement so that the motor/generator is operable to start the engine while disconnected from the output member.

* * * * *